(12) United States Patent
Devereaux et al.

(10) Patent No.: US 10,740,847 B1
(45) Date of Patent: Aug. 11, 2020

(54) METHOD AND SYSTEM FOR MAKING RAPID INSURANCE POLICY DECISIONS

(71) Applicant: United Services Automobile Association (USAA), San Antonio, TX (US)

(72) Inventors: Ramsey Devereaux, San Antonio, TX (US); David S. Franck, San Antonio, TX (US); Karen M. Moritz, Fair Oaks Ranch, TX (US); Spencer E. Read, Helotes, TX (US); Daniela M. Wheeler, Boerne, TX (US); Eric Vaith, San Antonio, TX (US); Erin E. McCaw, San Antonio, TX (US); Christopher Maurice Norman, San Antonio, TX (US); Jodi Jean Healy, Johns Greek, GA (US); Bharat Prasad, San Antonio, TX (US); Kathleen L. Swain, Kemah, TX (US); Michael J. Allen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 614 days.

(21) Appl. No.: 15/244,847

(22) Filed: Aug. 23, 2016

Related U.S. Application Data

(63) Continuation of application No. 14/303,347, filed on Jun. 12, 2014, now abandoned.
(Continued)

(51) Int. Cl.
*G06Q 40/08* (2012.01)

(52) U.S. Cl.
CPC .................................... *G06Q 40/08* (2013.01)

(58) Field of Classification Search
CPC ................................................ G06Q 40/00–08
(Continued)

(56) References Cited

U.S. PATENT DOCUMENTS

| 4,247,757 A | 1/1981 | Crump, Jr. |
| 5,182,705 A | 1/1993 | Barr et al. |

(Continued)

FOREIGN PATENT DOCUMENTS

| AT | 503861 B1 | 6/2008 |
| CA | 2478911 A1 | 9/2003 |

(Continued)

OTHER PUBLICATIONS

U.S. Appl. No. 14/862,776, Devereaux et al., filed Sep. 23, 2015.
(Continued)

*Primary Examiner* — Narayanswamy Subramanian
(74) *Attorney, Agent, or Firm* — Fletcher Yoder, P.C.

(57) ABSTRACT

A computer system and method for processing data to make rapid decisions regarding an insurance policy. Data is received from one or more informatic sensor devices and databases relating to an insured or insured property. A decision is identified that is to be rendered regarding an insurance policy in association with the insured. Predictive analytics is performed on the received data to determine the decision to be rendered regarding the insurance policy. Notification is provided of the determined decision regarding the insurance policy.

16 Claims, 5 Drawing Sheets

Related U.S. Application Data

(60) Provisional application No. 61/926,093, filed on Jan. 10, 2014, provisional application No. 61/926,091, filed on Jan. 10, 2014, provisional application No. 61/926,095, filed on Jan. 10, 2014, provisional application No. 61/926,098, filed on Jan. 10, 2014, provisional application No. 61/926,103, filed on Jan. 10, 2014, provisional application No. 61/926,108, filed on Jan. 10, 2014, provisional application No. 61/926,111, filed on Jan. 10, 2014, provisional application No. 61/926,114, filed on Jan. 10, 2014, provisional application No. 61/926,118, filed on Jan. 10, 2014, provisional application No. 61/926,119, filed on Jan. 10, 2014, provisional application No. 61/926,121, filed on Jan. 10, 2014, provisional application No. 61/926,123, filed on Jan. 10, 2014, provisional application No. 61/926,536, filed on Jan. 13, 2014, provisional application No. 61/926,541, filed on Jan. 13, 2014, provisional application No. 61/926,534, filed on Jan. 13, 2014, provisional application No. 61/926,532, filed on Jan. 13, 2014, provisional application No. 61/943,897, filed on Feb. 24, 2014, provisional application No. 61/943,901, filed on Feb. 24, 2014, provisional application No. 61/943,906, filed on Feb. 24, 2014, provisional application No. 61/948,192, filed on Mar. 5, 2014.

(58) Field of Classification Search
USPC .................................................. 705/4, 35
See application file for complete search history.

(56) References Cited

U.S. PATENT DOCUMENTS

| | | |
|---|---|---|
| 5,235,507 A | 8/1993 | Sackler et al. |
| 5,325,291 A | 6/1994 | Garrett et al. |
| 5,526,609 A | 6/1996 | Lee et al. |
| 5,724,261 A | 3/1998 | Denny et al. |
| 5,950,169 A | 9/1999 | Borghesi et al. |
| 5,960,338 A | 9/1999 | Foti |
| 5,991,733 A | 11/1999 | Aleia et al. |
| 6,029,141 A | 2/2000 | Bezos et al. |
| 6,049,773 A | 4/2000 | McCormack et al. |
| 6,141,686 A | 10/2000 | Jackowski et al. |
| 6,526,807 B1 | 3/2003 | Doumit et al. |
| 6,686,838 B1 | 2/2004 | Rezvani et al. |
| 6,766,322 B1 | 7/2004 | Bell |
| 6,826,607 B1 | 11/2004 | Gelvin et al. |
| 6,985,907 B2 | 1/2006 | Zambo et al. |
| 7,015,789 B1 | 3/2006 | Helgeson |
| 7,138,914 B2 | 11/2006 | Culpepper et al. |
| 7,142,099 B2 | 11/2006 | Ross et al. |
| 7,170,418 B2 | 1/2007 | Rose-Pehrsson et al. |
| 7,203,654 B2 | 4/2007 | Menendez |
| 7,398,218 B1 | 7/2008 | Bernaski et al. |
| 7,406,436 B1 | 7/2008 | Reisman |
| 7,602,196 B2 | 10/2009 | Vokey |
| 7,610,210 B2 | 10/2009 | Helitzer et al. |
| 7,624,031 B2 | 11/2009 | Simpson et al. |
| 7,624,069 B2 | 11/2009 | Padgette |
| 7,711,584 B2 | 5/2010 | Helitzer et al. |
| 7,716,076 B1 | 5/2010 | Block et al. |
| 7,739,133 B1 | 6/2010 | Hail et al. |
| 7,809,587 B2 * | 10/2010 | Dorai ............... G06Q 40/08 703/6 |
| 7,869,944 B2 | 1/2011 | Deaton et al. |
| 7,885,831 B2 | 2/2011 | Burton et al. |
| 7,899,560 B2 | 3/2011 | Eck |
| 7,937,437 B2 | 5/2011 | Fujii |
| 7,945,497 B2 | 5/2011 | Kenefick et al. |
| 7,949,548 B2 | 5/2011 | Mathai et al. |
| 7,958,184 B2 | 6/2011 | Barsness et al. |
| 7,969,296 B1 | 6/2011 | Stell |
| 8,004,404 B2 | 8/2011 | Izumi et al. |
| 8,041,636 B1 | 10/2011 | Hunter et al. |
| 8,046,243 B2 | 10/2011 | Winkler |
| 8,069,181 B1 | 11/2011 | Krishnan et al. |
| 8,081,795 B2 | 12/2011 | Brown |
| 8,086,523 B1 | 12/2011 | Palmer |
| 8,090,598 B2 | 1/2012 | Bauer et al. |
| 8,095,394 B2 | 1/2012 | Nowak et al. |
| 8,103,527 B1 | 1/2012 | Lasalle et al. |
| 8,106,769 B1 | 1/2012 | Maroney et al. |
| 8,229,767 B2 | 7/2012 | Birchall |
| 8,249,968 B1 | 8/2012 | Oldham et al. |
| 8,265,963 B1 | 9/2012 | Hanson et al. |
| 8,271,303 B2 * | 9/2012 | Helitzer ............... G06Q 40/08 705/4 |
| 8,271,308 B2 | 9/2012 | Winkler |
| 8,271,321 B1 | 9/2012 | Kestenbaum |
| 8,289,160 B1 | 10/2012 | Billman |
| 8,294,567 B1 | 10/2012 | Stell |
| 8,306,258 B2 | 11/2012 | Brown |
| 8,332,242 B1 | 12/2012 | Medina, III |
| 8,332,348 B1 | 12/2012 | Avery |
| 8,384,538 B2 | 2/2013 | Breed |
| 8,400,299 B1 | 3/2013 | Maroney et al. |
| 8,428,972 B1 | 4/2013 | Noles et al. |
| 8,452,678 B2 | 5/2013 | Feldman et al. |
| 8,510,196 B1 | 8/2013 | Brandmaier et al. |
| 8,515,788 B2 | 8/2013 | Tracy et al. |
| 8,521,542 B1 | 8/2013 | Stotts |
| 8,527,306 B1 | 9/2013 | Reeser et al. |
| 8,600,104 B2 | 12/2013 | Brown |
| 8,635,091 B2 | 1/2014 | Amigo et al. |
| 8,638,228 B2 | 1/2014 | Amigo et al. |
| 8,650,048 B1 | 2/2014 | Hopkins, III et al. |
| 8,676,612 B2 | 3/2014 | Helitzer et al. |
| 8,719,061 B2 | 5/2014 | Birchall |
| 8,731,975 B2 | 5/2014 | English et al. |
| 8,760,285 B2 | 6/2014 | Billman et al. |
| 8,774,525 B2 | 7/2014 | Pershing |
| 8,782,395 B1 | 7/2014 | Ly |
| 8,788,299 B1 | 7/2014 | Medina, III |
| 8,788,301 B1 | 7/2014 | Marlow et al. |
| 8,799,034 B1 | 8/2014 | Brandmaier et al. |
| 8,812,414 B2 | 8/2014 | Arthur et al. |
| 8,813,065 B2 | 8/2014 | Zygmuntowicz et al. |
| 8,868,541 B2 | 10/2014 | Lin et al. |
| 8,872,818 B2 | 10/2014 | Freeman et al. |
| 8,910,298 B2 | 12/2014 | Gettings et al. |
| 8,924,241 B2 | 12/2014 | Grosso |
| 8,930,581 B2 | 1/2015 | Anton et al. |
| 9,015,238 B1 | 4/2015 | Anton et al. |
| 9,049,168 B2 | 6/2015 | Jacob et al. |
| 9,053,516 B2 | 6/2015 | Stempora |
| 9,082,015 B2 | 7/2015 | Christopulos et al. |
| 9,141,995 B1 | 9/2015 | Brinkmann et al. |
| 9,158,869 B2 | 10/2015 | Labrie et al. |
| 9,165,084 B2 | 10/2015 | Isberg et al. |
| 9,183,560 B2 | 11/2015 | Abelow |
| 9,252,980 B2 | 2/2016 | Raman |
| 9,311,676 B2 | 4/2016 | Helitzer et al. |
| 9,330,550 B2 | 5/2016 | Zribi et al. |
| 9,363,322 B1 | 6/2016 | Anton et al. |
| 9,454,907 B2 | 9/2016 | Hafeez et al. |
| 9,460,471 B2 | 10/2016 | Bernard et al. |
| 9,481,459 B2 | 11/2016 | Staskevich et al. |
| 9,611,038 B2 | 4/2017 | Dahlstrom |
| 9,613,523 B2 | 4/2017 | Davidson et al. |
| 9,652,805 B1 | 5/2017 | Clawson, II et al. |
| 9,665,074 B2 | 5/2017 | Lentzitzky |
| 9,710,858 B1 | 7/2017 | Devereaux et al. |
| 9,747,571 B1 | 8/2017 | Ballew et al. |
| 9,754,325 B1 | 9/2017 | Konrardy et al. |
| 9,792,656 B1 | 10/2017 | Konrardy et al. |
| 9,811,862 B1 | 11/2017 | Allen et al. |
| 9,818,158 B1 | 11/2017 | Devereaux et al. |
| 9,842,310 B2 | 12/2017 | Lekas |
| 9,886,723 B1 | 2/2018 | Devereaux et al. |
| 9,892,463 B1 | 2/2018 | Hakimi-Boushehri et al. |

(56) References Cited

U.S. PATENT DOCUMENTS

| | | | |
|---|---|---|---|
| 9,934,675 B2 | 4/2018 | Coyne et al. | |
| 9,947,051 B1 | 4/2018 | Allen et al. | |
| 9,959,581 B2 | 5/2018 | Pershing | |
| 9,984,417 B1 | 5/2018 | Allen et al. | |
| 10,032,224 B2 | 7/2018 | Helitzer et al. | |
| 10,055,793 B1 | 8/2018 | Call et al. | |
| 10,055,794 B1 | 8/2018 | Konrardy et al. | |
| 10,121,207 B1 | 11/2018 | Devereaux et al. | |
| 10,163,162 B1 | 12/2018 | Devereaux et al. | |
| 10,181,159 B1 | 1/2019 | Allen et al. | |
| 10,380,699 B2 * | 8/2019 | Fernandes | G08G 5/0039 |
| 10,387,967 B1 * | 8/2019 | Hayward | G07C 5/00 |
| 2002/0007289 A1 | 1/2002 | Malin et al. | |
| 2002/0032586 A1 | 3/2002 | Joao | |
| 2002/0035528 A1 | 3/2002 | Simpson et al. | |
| 2002/0049618 A1 | 4/2002 | McClure et al. | |
| 2002/0055861 A1 | 5/2002 | King et al. | |
| 2002/0087364 A1 | 7/2002 | Lemer et al. | |
| 2002/0103622 A1 | 8/2002 | Burge | |
| 2002/0111835 A1 | 8/2002 | Hele et al. | |
| 2002/0116254 A1 | 8/2002 | Stein et al. | |
| 2002/0129001 A1 | 9/2002 | Levkoff et al. | |
| 2002/0178033 A1 | 11/2002 | Yoshioka et al. | |
| 2003/0040934 A1 | 2/2003 | Skidmore et al. | |
| 2003/0078816 A1 | 4/2003 | Filep | |
| 2003/0097335 A1 | 5/2003 | Moskowitz et al. | |
| 2003/0182441 A1 | 9/2003 | Andrew et al. | |
| 2004/0019507 A1 | 1/2004 | Yaruss et al. | |
| 2004/0034657 A1 | 2/2004 | Zambo et al. | |
| 2004/0039586 A1 | 2/2004 | Garvey et al. | |
| 2004/0046033 A1 | 3/2004 | Kolodziej et al. | |
| 2004/0064345 A1 | 4/2004 | Ajamian et al. | |
| 2004/0172304 A1 | 9/2004 | Joao | |
| 2004/0181621 A1 | 9/2004 | Mathur et al. | |
| 2004/0260406 A1 | 12/2004 | Ljunggren et al. | |
| 2005/0050017 A1 | 3/2005 | Ross et al. | |
| 2005/0055248 A1 | 3/2005 | Helitzer et al. | |
| 2005/0055249 A1 | 3/2005 | Helitzer et al. | |
| 2005/0057365 A1 | 3/2005 | Qualey | |
| 2005/0128074 A1 | 6/2005 | Culpepper et al. | |
| 2005/0197847 A1 | 9/2005 | Smith | |
| 2005/0226273 A1 | 10/2005 | Qian | |
| 2005/0251427 A1 | 11/2005 | Dorai et al. | |
| 2005/0278082 A1 | 12/2005 | Weekes | |
| 2006/0017558 A1 | 1/2006 | Albert et al. | |
| 2006/0026044 A1 | 2/2006 | Smith | |
| 2006/0052905 A1 | 3/2006 | Pfingsten et al. | |
| 2006/0111874 A1 | 5/2006 | Curtis et al. | |
| 2006/0200008 A1 | 9/2006 | Moore-Ede | |
| 2006/0218018 A1 | 9/2006 | Schmitt | |
| 2006/0219705 A1 | 10/2006 | Beier et al. | |
| 2006/0229923 A1 | 10/2006 | Adi et al. | |
| 2006/0235611 A1 | 10/2006 | Deaton et al. | |
| 2007/0005400 A1 | 1/2007 | Eggenberger et al. | |
| 2007/0005404 A1 | 1/2007 | Raz et al. | |
| 2007/0043803 A1 | 2/2007 | Whitehouse et al. | |
| 2007/0088579 A1 | 4/2007 | Richards | |
| 2007/0100669 A1 | 5/2007 | Wargin et al. | |
| 2007/0118399 A1 | 5/2007 | Avinash et al. | |
| 2007/0136078 A1 | 6/2007 | Plante | |
| 2007/0150319 A1 | 6/2007 | Menendez | |
| 2007/0156463 A1 | 7/2007 | Burton et al. | |
| 2007/0161940 A1 | 7/2007 | Blanchard et al. | |
| 2007/0174467 A1 | 7/2007 | Ballou et al. | |
| 2007/0214023 A1 | 9/2007 | Mathai et al. | |
| 2007/0282639 A1 | 12/2007 | Leszuk et al. | |
| 2007/0299677 A1 | 12/2007 | Maertz | |
| 2008/0033847 A1 | 2/2008 | McIntosh | |
| 2008/0052134 A1 * | 2/2008 | Nowak | G06Q 10/10 705/4 |
| 2008/0065427 A1 | 3/2008 | Helitzer et al. | |
| 2008/0077451 A1 | 3/2008 | Anthony et al. | |
| 2008/0086320 A1 | 4/2008 | Ballew et al. | |
| 2008/0114655 A1 | 5/2008 | Skidmore | |
| 2008/0140857 A1 | 6/2008 | Conner et al. | |
| 2008/0154651 A1 | 6/2008 | Kenefick et al. | |
| 2008/0154686 A1 | 6/2008 | Vicino | |
| 2008/0154851 A1 | 6/2008 | Jean | |
| 2008/0154886 A1 | 6/2008 | Podowski et al. | |
| 2008/0164769 A1 | 7/2008 | Eck | |
| 2008/0243558 A1 | 10/2008 | Gupte | |
| 2008/0244329 A1 | 10/2008 | Shinbo et al. | |
| 2008/0282817 A1 | 11/2008 | Breed | |
| 2008/0306799 A1 | 12/2008 | Sopko et al. | |
| 2008/0307104 A1 | 12/2008 | Amini et al. | |
| 2008/0319787 A1 | 12/2008 | Stivoric et al. | |
| 2009/0006175 A1 | 1/2009 | Maertz | |
| 2009/0024420 A1 | 1/2009 | Winkler | |
| 2009/0031175 A1 | 1/2009 | Aggarwal et al. | |
| 2009/0109037 A1 | 4/2009 | Farmer | |
| 2009/0119132 A1 | 5/2009 | Bolano et al. | |
| 2009/0135009 A1 | 5/2009 | Little et al. | |
| 2009/0177500 A1 | 7/2009 | Swahn | |
| 2009/0188202 A1 | 7/2009 | Vokey | |
| 2009/0205054 A1 | 8/2009 | Blotenberg et al. | |
| 2009/0216349 A1 | 8/2009 | Kwon et al. | |
| 2009/0240531 A1 | 9/2009 | Hilborn | |
| 2009/0240550 A1 | 9/2009 | McCarty | |
| 2009/0265193 A1 * | 10/2009 | Collins | G06Q 30/0185 705/4 |
| 2009/0265207 A1 | 10/2009 | Johnson | |
| 2009/0266565 A1 | 10/2009 | Char | |
| 2009/0279734 A1 | 11/2009 | Brown | |
| 2009/0287509 A1 | 11/2009 | Basak et al. | |
| 2010/0030586 A1 | 2/2010 | Taylor et al. | |
| 2010/0049552 A1 | 2/2010 | Fini et al. | |
| 2010/0131300 A1 | 5/2010 | Collopy et al. | |
| 2010/0131307 A1 | 5/2010 | Collopy et al. | |
| 2010/0174566 A1 | 7/2010 | Helitzer et al. | |
| 2010/0241464 A1 | 9/2010 | Amigo et al. | |
| 2010/0274590 A1 | 10/2010 | Compangano et al. | |
| 2010/0274859 A1 | 10/2010 | Bucuk | |
| 2010/0299161 A1 | 11/2010 | Burdick et al. | |
| 2010/0299162 A1 | 11/2010 | Kwan | |
| 2011/0043958 A1 | 2/2011 | Nakamura et al. | |
| 2011/0061697 A1 | 3/2011 | Behrenbruch et al. | |
| 2011/0112848 A1 | 5/2011 | Beraja et al. | |
| 2011/0137684 A1 | 6/2011 | Peak et al. | |
| 2011/0137685 A1 | 6/2011 | Tracy et al. | |
| 2011/0137885 A1 | 6/2011 | Isberg et al. | |
| 2011/0161117 A1 | 6/2011 | Busque et al. | |
| 2011/0161119 A1 | 6/2011 | Collins | |
| 2011/0295624 A1 | 12/2011 | Chapin et al. | |
| 2011/0320226 A1 | 12/2011 | Graziano et al. | |
| 2012/0004935 A1 | 1/2012 | Winkler | |
| 2012/0016695 A1 | 1/2012 | Bernard et al. | |
| 2012/0022897 A1 | 1/2012 | Shafer | |
| 2012/0025994 A1 | 2/2012 | Morris | |
| 2012/0028635 A1 | 2/2012 | Borg et al. | |
| 2012/0028835 A1 | 2/2012 | Wild et al. | |
| 2012/0046975 A1 | 2/2012 | Stolze | |
| 2012/0072240 A1 | 3/2012 | Grosso et al. | |
| 2012/0096149 A1 | 4/2012 | Sunkara et al. | |
| 2012/0101855 A1 | 4/2012 | Collins et al. | |
| 2012/0116820 A1 | 5/2012 | English et al. | |
| 2012/0123806 A1 * | 5/2012 | Schumann, Jr. | G08G 1/096775 705/4 |
| 2012/0130751 A1 | 5/2012 | McHugh et al. | |
| 2012/0143634 A1 | 6/2012 | Beyda et al. | |
| 2012/0158436 A1 * | 6/2012 | Bauer | G06Q 40/02 705/4 |
| 2012/0176237 A1 | 7/2012 | Tabe | |
| 2012/0215568 A1 | 8/2012 | Vahidi et al. | |
| 2012/0290333 A1 | 11/2012 | Birchall | |
| 2012/0311053 A1 | 12/2012 | Labrie et al. | |
| 2012/0311614 A1 | 12/2012 | DeAnna et al. | |
| 2012/0323609 A1 | 12/2012 | Fini | |
| 2012/0330719 A1 * | 12/2012 | Malaviya | G06Q 30/02 705/7.31 |
| 2013/0006608 A1 | 1/2013 | Dehors et al. | |
| 2013/0018936 A1 | 1/2013 | DAmico et al. | |
| 2013/0040636 A1 | 2/2013 | Borg et al. | |
| 2013/0040836 A1 | 2/2013 | Himmler et al. | |

(56) References Cited

U.S. PATENT DOCUMENTS

| | | |
|---|---|---|
| 2013/0055060 A1 | 2/2013 | Folsom et al. |
| 2013/0060583 A1 | 3/2013 | Collins et al. |
| 2013/0073303 A1 | 3/2013 | Hsu |
| 2013/0081479 A1* | 4/2013 | Miller .................. A61B 5/1113 73/862.53 |
| 2013/0095459 A1* | 4/2013 | Tran .................... A61B 5/6816 434/247 |
| 2013/0144658 A1 | 6/2013 | Schnabolk et al. |
| 2013/0144858 A1 | 6/2013 | Lin et al. |
| 2013/0182002 A1 | 7/2013 | Macciola et al. |
| 2013/0185716 A1 | 7/2013 | Yin et al. |
| 2013/0197945 A1 | 8/2013 | Anderson |
| 2013/0201018 A1 | 8/2013 | Horstemeyer et al. |
| 2013/0226623 A1 | 8/2013 | Diana et al. |
| 2013/0226624 A1 | 8/2013 | Blessman et al. |
| 2013/0245796 A1 | 9/2013 | Lentzitzky et al. |
| 2013/0253961 A1 | 9/2013 | Feldman et al. |
| 2013/0268358 A1 | 10/2013 | Haas |
| 2013/0282408 A1 | 10/2013 | Snyder et al. |
| 2013/0297418 A1* | 11/2013 | Collopy ............. G06Q 30/0224 705/14.53 |
| 2013/0317732 A1* | 11/2013 | Borg .................... G06Q 10/06 701/123 |
| 2014/0040343 A1 | 2/2014 | Nickolov et al. |
| 2014/0046701 A1 | 2/2014 | Steinberg et al. |
| 2014/0050147 A1 | 2/2014 | Beale |
| 2014/0058761 A1 | 2/2014 | Freiberger et al. |
| 2014/0067137 A1 | 3/2014 | Amelio et al. |
| 2014/0081675 A1 | 3/2014 | Ives et al. |
| 2014/0089156 A1 | 3/2014 | Williams et al. |
| 2014/0089990 A1 | 3/2014 | van Deventer et al. |
| 2014/0108275 A1 | 4/2014 | Heptonstall |
| 2014/0114693 A1 | 4/2014 | Helitzer et al. |
| 2014/0114893 A1 | 4/2014 | Arthur et al. |
| 2014/0123292 A1 | 5/2014 | Schmidt et al. |
| 2014/0123309 A1 | 5/2014 | Jung et al. |
| 2014/0132409 A1 | 5/2014 | Billman et al. |
| 2014/0136242 A1 | 5/2014 | Weekes et al. |
| 2014/0142989 A1 | 5/2014 | Grosso |
| 2014/0149485 A1 | 5/2014 | Sharma et al. |
| 2014/0180723 A1 | 6/2014 | Cote et al. |
| 2014/0192646 A1 | 7/2014 | Mir et al. |
| 2014/0195272 A1 | 7/2014 | Sadiq et al. |
| 2014/0201072 A1 | 7/2014 | Reeser et al. |
| 2014/0201315 A1 | 7/2014 | Jacob et al. |
| 2014/0214458 A1 | 7/2014 | Vahidi et al. |
| 2014/0257862 A1 | 9/2014 | Billman et al. |
| 2014/0257863 A1 | 9/2014 | Maastricht et al. |
| 2014/0266669 A1 | 9/2014 | Fadell et al. |
| 2014/0270492 A1 | 9/2014 | Christopulos et al. |
| 2014/0278561 A1* | 9/2014 | Knuffke ................ G06Q 40/08 705/4 |
| 2014/0278573 A1 | 9/2014 | Cook |
| 2014/0279593 A1 | 9/2014 | Pershing |
| 2014/0280457 A1 | 9/2014 | Anton et al. |
| 2014/0304007 A1 | 10/2014 | Kimball et al. |
| 2014/0316614 A1 | 10/2014 | Newman |
| 2014/0322676 A1 | 10/2014 | Raman |
| 2014/0327995 A1 | 11/2014 | Panjwani et al. |
| 2014/0334492 A1 | 11/2014 | Mack-Crane |
| 2014/0358041 A1* | 12/2014 | Hopcroft .................. A61B 5/11 600/595 |
| 2014/0358592 A1 | 12/2014 | Wedig et al. |
| 2014/0371941 A1 | 12/2014 | Keller et al. |
| 2014/0375440 A1 | 12/2014 | Rezvani et al. |
| 2014/0380264 A1 | 12/2014 | Misra et al. |
| 2015/0006206 A1 | 1/2015 | Mdeway |
| 2015/0019266 A1 | 1/2015 | Stempora |
| 2015/0025915 A1 | 1/2015 | Lekas |
| 2015/0025917 A1 | 1/2015 | Stempora |
| 2015/0026074 A1 | 1/2015 | Cotten |
| 2015/0112504 A1 | 4/2015 | Binion et al. |
| 2015/0154709 A1 | 6/2015 | Cook |
| 2015/0154712 A1 | 6/2015 | Cook |
| 2015/0161738 A1 | 6/2015 | Stempora |
| 2015/0221051 A1 | 8/2015 | Settino |
| 2015/0332407 A1 | 11/2015 | Wilson et al. |
| 2015/0339911 A1 | 11/2015 | Coyne et al. |
| 2015/0370272 A1 | 12/2015 | Reddy et al. |
| 2015/0372832 A1 | 12/2015 | Kortz et al. |
| 2016/0005130 A1 | 1/2016 | Devereaux et al. |
| 2016/0039921 A1 | 2/2016 | Luo et al. |
| 2016/0055594 A1 | 2/2016 | Emison |
| 2016/0067547 A1 | 3/2016 | Anthony et al. |
| 2016/0104250 A1 | 4/2016 | Allen et al. |
| 2016/0125170 A1 | 5/2016 | Abramowitz |
| 2016/0163186 A1 | 6/2016 | Davidson et al. |
| 2016/0225098 A1 | 8/2016 | Helitzer et al. |
| 2017/0178424 A1 | 6/2017 | Wright |
| 2017/0365008 A1 | 12/2017 | Schreier et al. |
| 2018/0339653 A1* | 11/2018 | Adams .................... B60Q 9/00 |
| 2019/0172147 A1* | 6/2019 | Ward .................... G06Q 40/08 |

FOREIGN PATENT DOCUMENTS

| | | |
|---|---|---|
| CA | 2518482 C | 3/2007 |
| CA | 2805226 A1 | 8/2013 |
| CA | 2882086 A1 | 2/2014 |
| CN | 103203054 B | 7/2013 |
| DE | 102005015028 B4 | 10/2006 |
| DE | 102008008317 A1 | 8/2009 |
| EP | 0722145 A1 | 7/1996 |
| EP | 1790057 B1 | 5/2012 |
| EP | 2795757 A4 | 10/2014 |
| EP | 2276135 B1 | 4/2015 |
| EP | 3255613 A1 | 12/2017 |
| GB | 2449510 A | 11/2008 |
| JP | 3282937 B2 | 5/2002 |
| JP | 2002358425 A | 12/2002 |
| JP | 2008250594 A | 10/2008 |
| KR | 20090090461 A | 8/2009 |
| MX | 337513 B | 8/2009 |
| RU | 2015109725 A | 10/2016 |
| WO | 2004034232 A2 | 4/2004 |
| WO | 2006074682 A2 | 7/2006 |
| WO | 2010136163 A1 | 12/2010 |
| WO | 2012075442 A1 | 6/2012 |
| WO | 2013036677 A1 | 3/2013 |
| WO | WO 2013/036677 | 3/2013 |

OTHER PUBLICATIONS

U.S. Appl. No. 14/251,392, Allen et al., filed Apr. 11, 2014.
U.S. Appl. No. 14/251,377, Devereaux et al., filed Apr. 11, 2014.
U.S. Appl. No. 14/251,404, Devereaux et al., filed Apr. 11, 2014.
U.S. Appl. No. 14/251,411, Allen et al., filed Apr. 11, 2014.
U.S. Appl. No. 14/273,877, Allen et al., filed May 9, 2014.
U.S. Appl. No. 14/273,889, Devereaux et al., filed May 9, 2014.
U.S. Appl. No. 14/273,918, Allen et al., filed May 9, 2014.
U.S. Appl. No. 14/278,182, Allen et al., filed May 15, 2014.
U.S. Appl. No. 14/278,202, Allen et al., filed May 15, 2014.
U.S. Appl. No. 14/303,336, Devereaux et al., filed Jun. 12, 2014.
U.S. Appl. No. 14/303,347, Devereaux et al., filed Jun. 12, 2014.
U.S. Appl. No. 14/303,370, Allen et al., filed Jun. 12, 2014.
U.S. Appl. No. 14/303,382, Allen et al., filed Jun. 12, 2014.
U.S. Appl. No. 14/305,732, Devereaux et al., filed Jun. 16, 2014.
U.S. Appl. No. 14/324,534, Devereaux et al., filed Jul. 7, 2014.
U.S. Appl. No. 14/324,546, Devereaux et al., filed Jul. 7, 2014.
U.S. Appl. No. 14/324,609, Devereaux et al., filed Jul. 7, 2014.
U.S. Appl. No. 14/324,618, Devereaux et al., filed Jul. 7, 2014.
U.S. Appl. No. 14/324,748, Devereaux et al., filed Jul. 7, 2014.
U.S. Appl. No. 14/324,759, Devereaux et al., filed Jul. 7, 2014.
U.S. Appl. No. 61/800,561, Sanidas et al., filed Mar. 15, 2013.
U.S. Appl. No. 61/866,779, Bergner, filed Aug. 16, 2013.
U.S. Appl. No. 61/926,091, Allen et al., filed Jan. 10, 2014.
U.S. Appl. No. 61/926,093, Allen et al., filed Jan. 10, 2014.
U.S. Appl. No. 61/926,095, Allen et al., filed Jan. 10, 2014.
U.S. Appl. No. 61/926,098, Allen et al., filed Jan. 10, 2014.
U.S. Appl. No. 61/926,103, Devereaux et al., filed Jan. 10, 2014.
U.S. Appl. No. 61/926,108, Allen et al., filed Jan. 10, 2014.

(56) References Cited

OTHER PUBLICATIONS

U.S. Appl. No. 61/926,111, Allen et al., filed Jan. 10, 2014.
U.S. Appl. No. 61/926,114, Devereaux et al., filed Jan. 10, 2014.
U.S. Appl. No. 61/926,118, Devereaux et al., filed Jan. 10, 2014.
U.S. Appl. No. 61/926,119, Devereaux et al., filed Jan. 10, 2014.
U.S. Appl. No. 61/926,121, Devereaux et al., filed Jan. 10, 2014.
U.S. Appl. No. 61/926,123, Devereaux et al., filed Jan. 10, 2014.
U.S. Appl. No. 61/926,532, Allen et al., filed Jan. 13, 2014.
U.S. Appl. No. 61/926,534, Allen et al., filed Jan. 13, 2014.
U.S. Appl. No. 61/926,536, Allen et al., filed Jan. 13, 2014.
U.S. Appl. No. 61/926,541, Allen et al., filed Jan. 13, 2014.
U.S. Appl. No. 61/943,897, Devereaux et al., filed Feb. 24, 2014.
U.S. Appl. No. 61/943,901, Devereaux et al., filed Feb. 24, 2014.
U.S. Appl. No. 61/943,906, Devereaux et al., filed Feb. 24, 2014.
U.S. Appl. No. 61/948,192, Davis et al., filed Mar. 5, 2014.
U.S. Appl. No. 62/311,491, Moy, filed Mar. 22, 2016.
U.S. Appl. No. 62/325,250, Rodgers et al., filed Apr. 20, 2016.
U.S. Appl. No. 62/351,427, Devereaux et al., filed Jun. 17, 2016.
U.S. Appl. No. 62/351,441, Flachsbart et al., filed Jun. 17, 2016.
U.S. Appl. No. 62/351,451, Chavez et al., filed Jun. 17, 2016.
"After an Auto Accident: Understanding the Claims Process," Financial Services Commission on Ontario, 2011, 10 pgs.
"Truck Crash Event Data Recorder Downloading," Crash Forensic; 2012, pp. 1-25.
Aiyagari, Sanjay et al., "AMQP Message Queuing Protocol Specification," Version Dec. 9, 2006. https://www.rabbitmq.com/resources/specs/amqp0-9.
Amanda Love, "How Recoverable Depreciation Works", Aug. 6, 2012, http://www.stateroofingtexas.com/recoverable-depreciation-works/.
AMQP is the Internet Protocol for Business Messaging Website. Jul. 4, 2011. https://web.archive.org/web/20110704212632/http://www.amqp.org/about/what.
Cloudera.com, "Migrating from MapReduce 1 (MRv1) to Map Reduce 2 (MRv2, YARN)", https://www.cloudera.com/documentation/enterprise/5-9-x/topics/cdh_ig_mapreduce_to_yarn_migrate.html, page generated Feb. 6, 2018.
Corbett et al., "Spanner: Google's Globally-Distributed Database," Google, Inc., pp. 1-14, 2012.
Das, Sudipto et al., "Ricardo: Integrating R and Hadoop," IBM Almaden Research Center, SIGMOD'10, Jun. 6-11, 2010.
Dean et al., "A New Age of Data Mining in the High-Performance World," SAS Institute Inc., 2012.
Deerwester et al., "Indexing by Latent Semantic Analysis," Journal of the American Society for Information Science, 1990.41 (6), pp. 391-407.
Farmers Next Generation Homeowners Policy, Missouri, by Farmers insurance Exchange; 2008; 50 pages.
Fong et al., "Toward a scale-out data-management middleware for low-latency enterprise computing," IBM J. Res & Dev. vol. 57, No. 3/4 Paper, May 6-Jul. 2013.
Glennon, Jr., John C.; "Motor Vehicle Crash Investigation and Reconstruction," BSAT, 2001, 4 pgs.
Gonzalez Ribeiro, Ana, "Surprising things your home insurance covers," Jan. 12, 2012 in Insurance; 4 pages.
Hopkins, Brian, "Big Opportunities in Big Data Positioning Your Firm to Capitalize in a Sea of Information," Enterprise Architecture Professionals, Forrester Research, Inc., pp. 1-9, May 2011.
Iwasaki, Yoji; Yamazaki, Fumimo, Publication Info: 32nd Asian Conference on Remote Sensing 2011, ACRS 2011 1: 550-555. Asian Association on Remote Sensing. (Dec. 1, 2011) (Year: 2011).
Kopp et al., "Full-scale testing of low-rise, residential buildings with realistic wind loads", 2012, 15 pages.
McKeown et al., "OpenFlow: Enabling Innovation in Campus Networks," pp. 1-6, Mar. 14, 2008.
Melnik, Sergey et al., "Dremel: Interactive Analysis of Web-Scale Datasets," 36th International Conference on Very Large Data Bases, Sep. 13-17, 2010, Singapore, Proceedings of the VLDB Endowment, vol. No. 1.
NYSE Technologies Website and Fact Sheet for Data Fabric 6.0 Aug. 2011, https://web.archive.org/web/20110823124532/http://nysetechnologies.nyx.com/data-technology/data-fabric-6-0.
Richardson, Alexis, "Introduction to RabbitMQ, An Open Source Message Broker That Just Works," Rabbit MQ, Open Source Enterprise Messaging, pp. 1-36, May 13, 2009.
Stefan Theußl, "Applied High Performance Computing Using R," Diploma Thesis, Univ. Prof, Dipl, Ing. Dr. Kurt Hornik, pp. 1-126, Sep. 27, 2007.
STIC search dated Jan. 4, 2019 (Year 2019).
Telematics Set the Stage the Improved Auto Claims Management by Sam Friedman (Oct. 10, 2012); 3 pages.
Wang, Guohul et al., "Programming Your Network at Run-time for Big Data Applications," IBM T.J. Watson Research Center, Rice University, HotSDN'12, Aug. 13, 2012, Helsinki, Finland.
Wang, Jianwu et al., "Kepler + Hadoop: A General Architecture Facilitating Data-Intensive Applications in Scientific Workflow Systems," WORKS 09, Nov. 15, 2009, Portland, Oregon, USA.
Webb, Kevin C. et al., "Topology Switching for Data Center Networks," Published in: Proceeding Hot-ICE'11 Proceedings of the 11th USENIX conference on Hot topics in management of Internet, cloud, and enterprise networks and services, Mar. 29, 2011.
Xi et al., "Enabling Flow-Based Routing Control in Data Center Networks using Probe and ECMP," Polytechnic Institute of New York University, IEE INFOCOM 2011, pp. 614-619.
Zevnik, Richard. The Complete Book of Insurance. Sphinx. 2004. pp. 76-78.

* cited by examiner

METHOD AND SYSTEM FOR MAKING RAPID INSURANCE POLICY DECISIONS

CROSS REFERENCE TO RELATED APPLICATIONS

This application is a continuation application of, and claims priority to, U.S. patent application Ser. No. 14/303,347, titled "Method And System For Making Rapid Insurance Policy Decisions," filed on Jun. 12, 2014, which application claims priority to U.S. Patent Application Ser. Nos. 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014. The disclosure of each of the foregoing applications is incorporated herein by reference.

FIELD OF THE INVENTION

The disclosed embodiments generally relate to a method and computerized system for managing insurance and related products and services, and more particularly, to aggregating and utilizing data relating to an insured or insured property for creating, publishing, underwriting, selling and managing insurance and related products and services.

BACKGROUND OF THE INVENTION

Smart home functionality is a maturing space, but the opportunity for insurance companies remains largely untapped. Currently, there are few useful early warning and loss mitigation systems that actually save costs and time for both the property owner and insurance company alike. For instance, currently, homeowners insurance claim events are detected by the homeowner, who contacts the insurance company to inform them that there has been a loss. However, the loss could be mitigated with automated warning and detection systems that interface with the insurance company systems. For example, homeowners may not become aware of minor to medium hail damage to their roofs until such time as that damage leads to water damage to the interior or exterior of the home. If they could be made aware of such loss events earlier and then take corrective actions, then the increased damage could have been mitigated or avoided.

Another maturing space concerns vehicle telematics in which the latest developments in automotive electronics are dealing with the automatic monitoring of the state of a vehicle. Such monitoring is based on the integration of numerous sensors into the vehicle such that important functional parts and components may be monitored. It is becoming of increasing interest to collect a variety of information, regarding different aspects of a vehicle, which may have different applications depending on their usage. The use of telematics in automobiles has become more common in recent years, particularly as implemented with in-car navigation systems.

In this regard, there is utility and functionality to be provided by aggregating smart home functionality with vehicle telematics and other risk or loss related data to facilitate rapid decision making process.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system and method for processing data to make rapid decisions regarding an insurance policy is described in which data is received from one or more informatic sensor devices and databases relating to an insured or insured property. A decision is identified that is to be rendered regarding an insurance policy in association with the insured or insured property. Predictive analytics is performed on the received data to determine the decision to be rendered regarding the insurance policy. Notification is provided of the determined decision regarding the insurance policy.

In another aspect, a computing device coupled to sensors is described which may be installed in or on an insured property in order to measure and/or record conditions and/or events present at the insured property via sensors positioned relative to the insured property. For example, the computing device may record information such as various structural conditions, water flow rate, water pressure, electrical measurements, mechanical vibrations, or any other relevant factors including utilization of data retrieved from a Customer Relationship Management software tool as well as capturing information regarding surrounding risks or characteristics associated with an insured or insured property. The information captured by the computing device may be utilized to perform, for example, insured property maintenance analytics.

In another aspect, numerous sensors may be installed in a vehicle in order to measure and/or record a variety of information, regarding different aspects of the vehicle. For example, the sensors may record information such as movements, status and behavior of a vehicle, or any other factors. The information captured by the vehicle telematics may be utilized, for example, to ensure that the premiums policyholders are paying are representative or reflective of their driving style and the way their vehicle is used.

In still another aspect, numerous sensors may collect various measurements indicative of health and wellness factors. The health information may include lifestyle factors such as exercise, diet, and activity level, as well as clinical factors such as blood pressure, cholesterol and weight preferably relating to an insured. The information captured by the sensors may be utilized, for example, to ensure that the premiums policyholders are paying are representative or reflective of their health condition and lifestyle.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
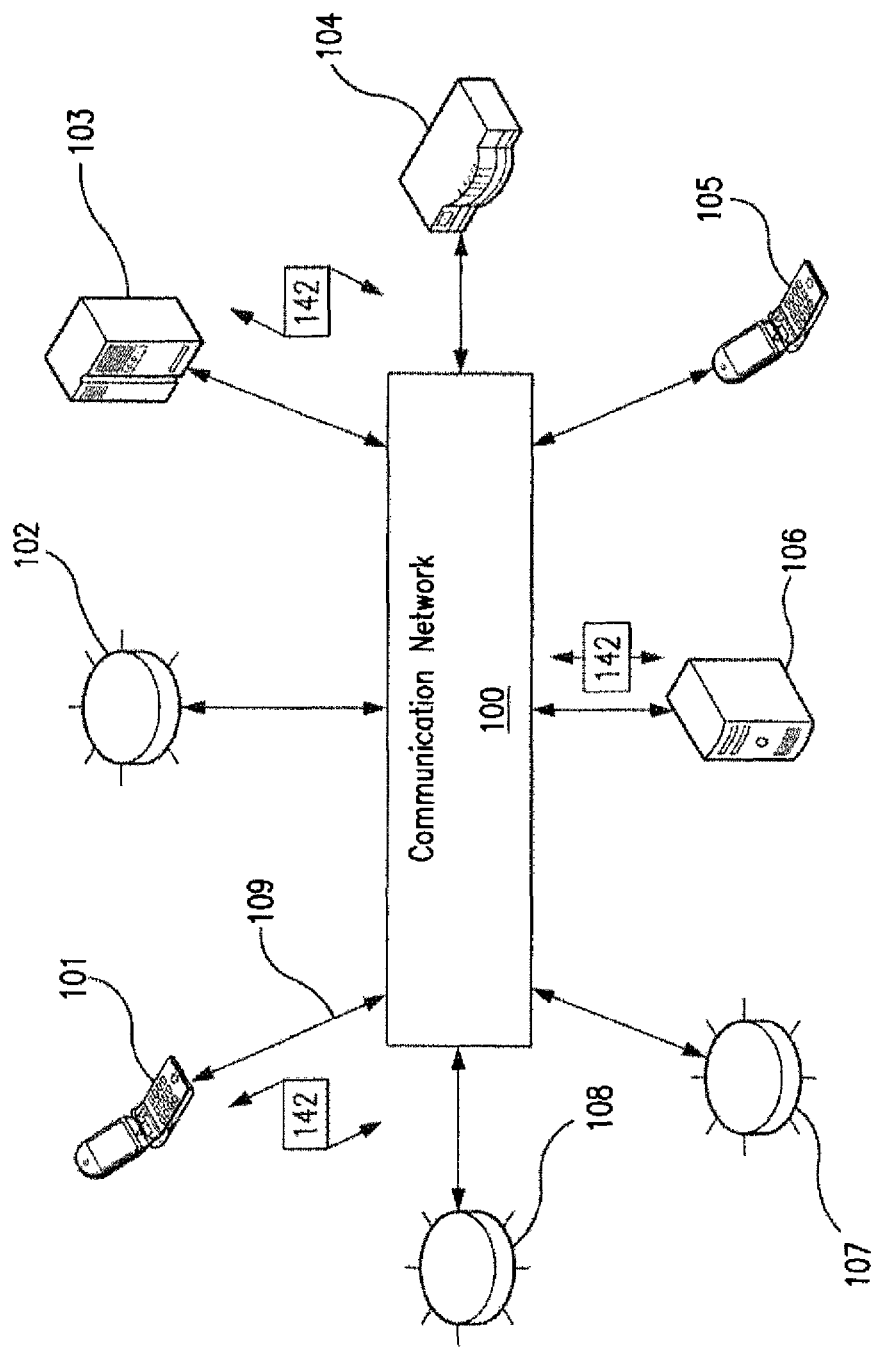
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety. This application additionally relates to U.S. patent application Ser. No. 13/670,328 filed Nov. 6, 2012, which claims continuation priority to U.S. patent application Ser. No. 12/404,554 filed Mar. 16, 2009 which are incorporated herein by reference in their entirety.

As used herein, the term "insurance policy" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As also used herein, "insured" may refer to an applicant for a new insurance policy and/or may refer to an insured under an existing insurance policy.

As used herein, the term "insurance policy" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., informatic sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example (but not limited to), an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including (but not limited to) electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including (but not limited to) wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
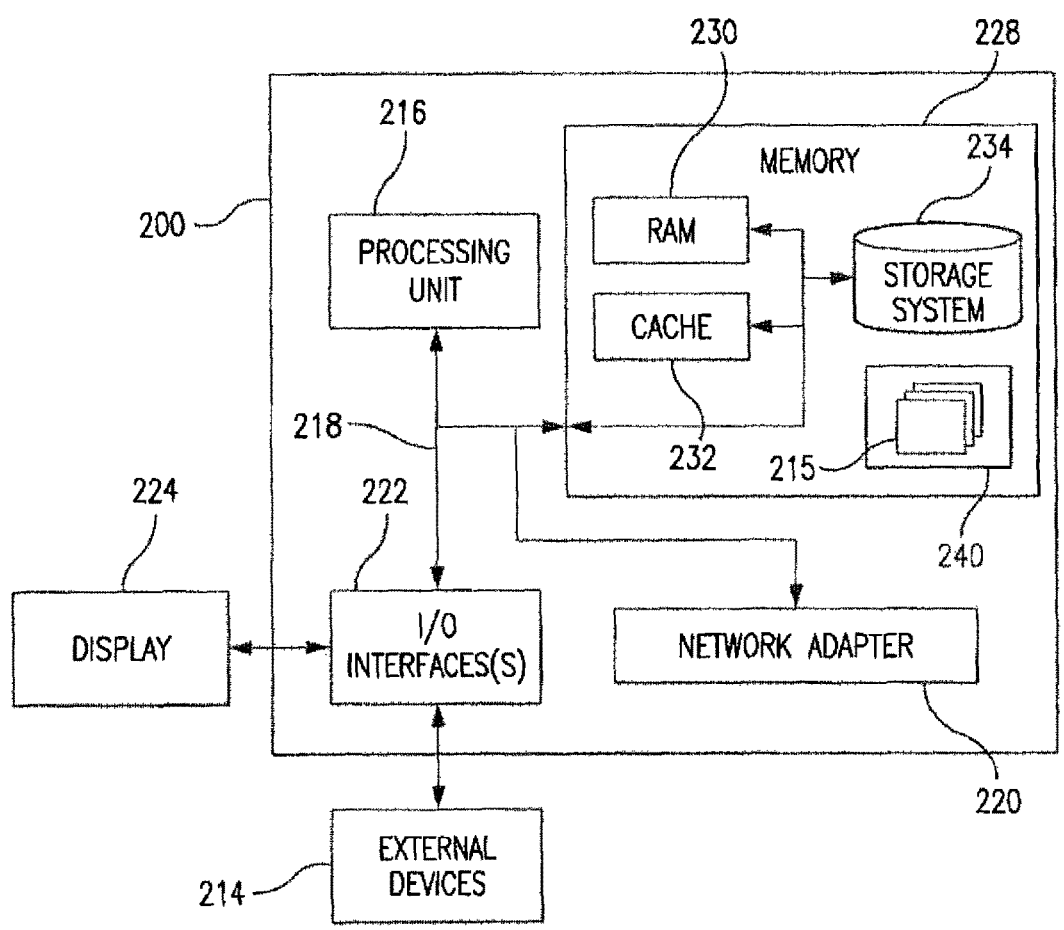
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Computing device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Computing device 200 is shown in FIG. 2 in the form of a general-purpose computing device. The components of computing device 200 may include, but are not limited to, one or more processors or processing units 216, a system memory 228, and a bus 218 that couples various system components including system memory 228 to processor 216.

Bus 218 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by computing device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as data analyzer module 306 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Computing device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, computing device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with computing device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
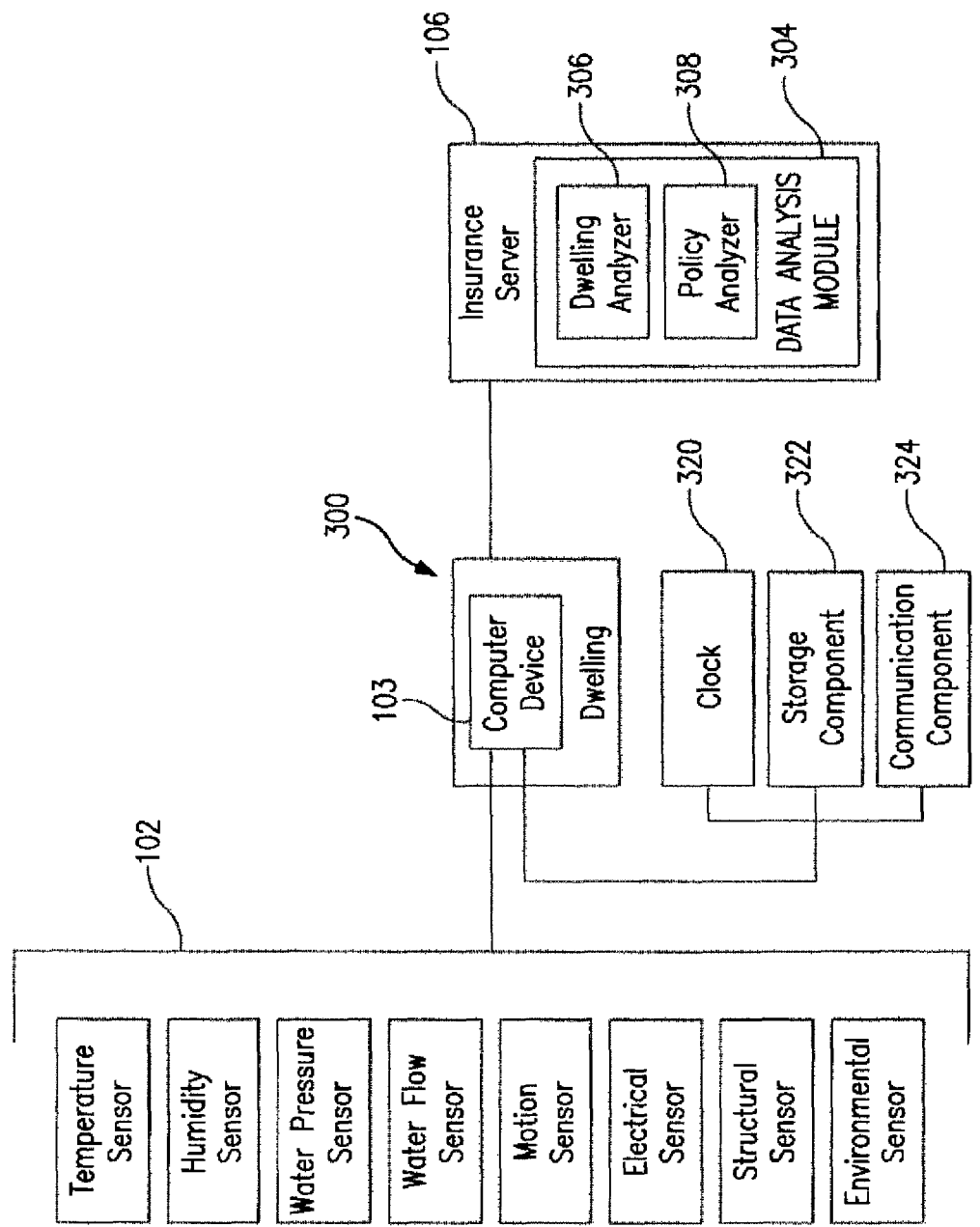
FIG. 3 is a block diagram of an insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of insured property structure (e.g., residential, commercial, retail, municipal, etc.) in which the capture and analysis of informatic sensor data is useful for the reasons at least described below. Insured property 300 preferably includes a computing device 103 for capturing data from a plurality of informatic sensors 102 which capture data regarding various aspects of insured property 300, as further described below. It is to be understood computing device 103 may be located in any location, and its position is not limited to the example shown.

Computing device 103 is preferably configured and operational to receive (capture) informatic data from various informatic sensors 102 regarding certain aspects (including functional and operational) of insured property 300 (described further below) and transmit that captured data to a remote server 106, via network 100. It is noted device 103 may perform analytics regarding the captured informatic sensor data regarding insured property 300 and/or the remote server 106, preferably controlled by an insurance company/carrier, may perform such analytics, as also further described below. It is also to be understood in other embodiments, data from informatic sensors 102 may be transmitted directly to remote server 106, via network 100, thus either obviating the need for computing device 103 or mitigating its functionality to capture all data from sensors 102.

In the illustrated embodiment of FIG. 3, computing device 103 is shown coupled to various below described informatic sensor types 102. It is to be understood and appreciated, in accordance with the embodiments herein, sensors 102 are preferably installed, and its data is collected, maintained, accessed and otherwise utilized under the permission of the insured(s) subject to appropriate security and privacy concerns.

Although various informatic sensor types 102 are described below and shown in FIG. 3, the informatic sensor types described and shown herein are not intended to be exhaustive as embodiments of the present invention may encompass any type of known or unknown sensor type which facilitates the purposes and objectives of the certain illustrated embodiments described herein. Exemplary informatic sensor types include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300. Humidity readings from one or more locations inside and/or outside the insured property could thus be recorded by device 103.

Water Sensor(s)/Water pressure sensor(s)—configured and operational to preferably monitor water related conditions, including (but not limited to) the detection of water and water pressure detection, for instance in the plumbing system in the insured property 300. With regards to a water pressure sensor, it may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time.

Water flow sensor—configured and operational to preferably monitor water flow rate in the plumbing system in the insured property 300. Water flow sensor may have one or more probes attached to various locations of the insured property's 300 plumbing, such as faucets, showerheads and appliances, and thus device 103 may measure and/or record the amount of water flowing through the insured property's 300 water supply system. Thus, device 103 may record the water flow that is present in the plumbing system at various points in time.

Leak detection sensor—configured and operational to preferably monitor the presence of leaks from gas and water plumbing pipes both inside and outside the walls of the insured property 300. The leak detection sensor may have one or more probes attached to various locations of the insured property's 300 plumbing and piping, and this device 103 may record the fact that there is a gas or water leak. An example of this is that a leak detection sensor can be placed behind the washing machine. If the hoses that connect the washing machine to the water line were to break the leak detection sensor would know that there was a water leak and notify the insured and/or the insurance company. The insured can also give prior authorization to the insurance company to act on their behalf to correct the water leak. An analysis model could use the information about how often the leak detection sensor alerts, whether the insured uses leak detection sensor(s), and where they are placed in various ways such as rating the home insurance, tracking water pressure, and/or providing advice and guidance.

Wind speed sensor—configured and operational to record the wind speed present at the insured property 300. For example, one or more wind sensors may be placed outside the insured property 300, at the wind speed and/or direction may be recorded at various points in time. Device 103 may record these wind speed and/or wind direction readings. The wind speed may be used by an analysis model to plan for future losses and/or to make underwriting decisions.

Motion sensor—configured and operational to sense motion in the insured property 300 to which device 300 is attached. Typically, insured properties 300 do not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the insured property.

Electrical system sensor/analyzer—configured and operational to assess the condition of the insured property's 300 electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Any type of data about the insured property's 300 electrical system could be captured by device 103. An analysis model could use the information about electrical energy in various ways such as rating the home insurance, tracking energy consumption, or providing advice and guidance.

Positional sensor—configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While an insured property 300 normally does not move, positional sensor may allow device 103 to be recovered in the event of a catastrophe. For example, if an insured property 300 explodes, or is otherwise catastrophically damaged, device 103 may be propelled to an unknown location. Positional sensor may indicate the geographical area of an insured property 300 which an analysis model could use in various ways. Positional sensor may record the position of device 103, which device 103 could communicate to an external source, thereby allowing device 103 to be found.

Structural sensor—configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any other components functional to detect such conditions. Structural readings from one or more locations inside and/or outside the insured property 300 could thus be recorded by device 103 and used by an analysis model in various ways.

Environmental sensor—configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

Appliance sensor—configured and operational to preferably detect various operating parameters relating to appliances within an insured property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.) electrical generator system, pool filtration and heating system, garage door openers, sump pump and water well system, septic tank system, etc. An appliance sensor may comprise detection hardware, or may employ one or more remote probes, which may be located inside and/or outside the insured property 300 functional to detect certain operating parameters of appliances. Operating parameters detected by an informatic sensor 102 (appliance sensor) may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). Such appliance readings from one or more insured property appliances could thus be recorded by device 103 and used by an analysis model in various ways.

Activity monitoring sensor—configured and operational to obtain information related to physical activity of the policyholder associated with an insured property 300. Three general categories of sensors can be used for measuring physical activity: movement sensors, physiological sensors, and contextual sensors. Many movement sensors can be used to measure human physical activities, including electromechanical switches (for heel strike detections), mercury switches, pedometers, inclinometers, gyroscopes and goniometers (for angles or postures), and accelerometers. Collectively, accelerometers are well-suited for measuring intensity of movements, thus are predominately used for assessing outcomes, such as overall physical activity levels and estimated energy expenditure. Examples of physiologic sensors may include (but are not limited to) heart rate, gas exchange ($O_2$ and $CO_2$ in breath and in blood), blood pressure, temperature (skin and core body), heat flux, sweating (galvanic skin response), blood chemistry (continuous glucose), electromyogram (electrical activity of muscle), and breathing frequency and volume. Some additional physiologic sensors may be useful for measuring specific components of physical activity that could not be achieved using movement sensors, such as using an electromyogram to assess skeletal muscle function and implantable sensors to detect blood glucose levels. Local contextual sensors can be used to answer questions about physical activity within structures, such as work-based activity patterns or movement patterns within the insured property 300.

With exemplary sensors 102 identified and briefly described above, and as will be further discussed below, it is to be generally understood sensors 102 preferably record certain data parameters relating to products and services provided by an insurance carrier, such as USAA, to facilitate rapid decision making process as described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.). It is additionally to be understood and appreciated that sensors 102 can be networked into a central computer hub (e.g., device 103) in an insured property to aggregate collected sensor data packets. Aggregated data packets can be analyzed in either a computer system (e.g., device 103) or via an external computer environment (e.g., server 106). Additionally, it is to be understood data packets collected from sensors 102 can be aggregated in computing device 103 and sent as an aggregated packet to server 106 for subsequent analysis whereby data packets may be transmitted at prescribed time intervals (e.g., a benefit is to reduce cellular charges in that some insured property's 300 may not have Internet access or cellular service is backup when insured property Internet service is nonfunctioning).

In accordance with an illustrated embodiment, in addition to the aforementioned, the sensors 102 being utilized relative to insured property 300, computing device 103 may additionally be coupled to a Clock 320 which may keep track of time for device 103, thereby allowing a given item of data to be associated with the time at which the data was captured. For example, device 103 may recurrently detect various environmental conditions relating to insured property 300, recurrently capture images of various portions of the structure of insured property 300, etc., and may timestamp each reading and each image. The time at which the readings are taken may be used to reconstruct events or for other analytic purposes, such as those described below. For example, the timestamps on physiological measurements may be indicative of a certain health condition.

A storage component 322 may further be provided and utilized to store data readings and/or timestamps in device 103. For example, storage component 322 may comprise, or may otherwise make use of, magnetic or optical disks, volatile random-access memory, non-volatile random-access memory or any other type of storage device. There may be sufficient data storage capacity to store several days or several weeks' worth of readings. For example, to better understand the intensity, timing, and frequency of policyholder's physical activity it may be necessary to look at a week's worth of data. Accordingly, storage component 322 might have sufficient storage capacity to allow, for example five days of readings to be stored.

A communication component 324 may further be provided and utilized to communicate recorded information from computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from computing device 103 to learn about risks, repair needs and other analytics related to insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for computing device 103.

In the example of FIG. 3, communication component 324 (which is shown, in FIG. 3, as being part of, or used by, computing device 103) communicates data to server 106. Server 106 may comprise, or otherwise may cooperate with, a data analysis module 304, which may analyze data in some manner. Data analysis module 304 may comprise various types of sub-modules, such as data analyzer 306. In general, data analyzer 306 may perform an analysis of collected data regarding various attributes of insured property 300, such as, for example (but not limited to), one or more utility systems associated with the insured property 300, structural condition of the insured property 300 and environmental conditions detected in the vicinity of the insured property 300. In another aspect, data analyzer 306 may be also configured and operable to analyze data related to health condition and/or other aspects related to an insurance profile of a policyholder associated with insured property 300. Server 106 may further comprise, or otherwise may cooperate with, a data repository 310, which may store captured informatics sensor data and information.

Figure 4:
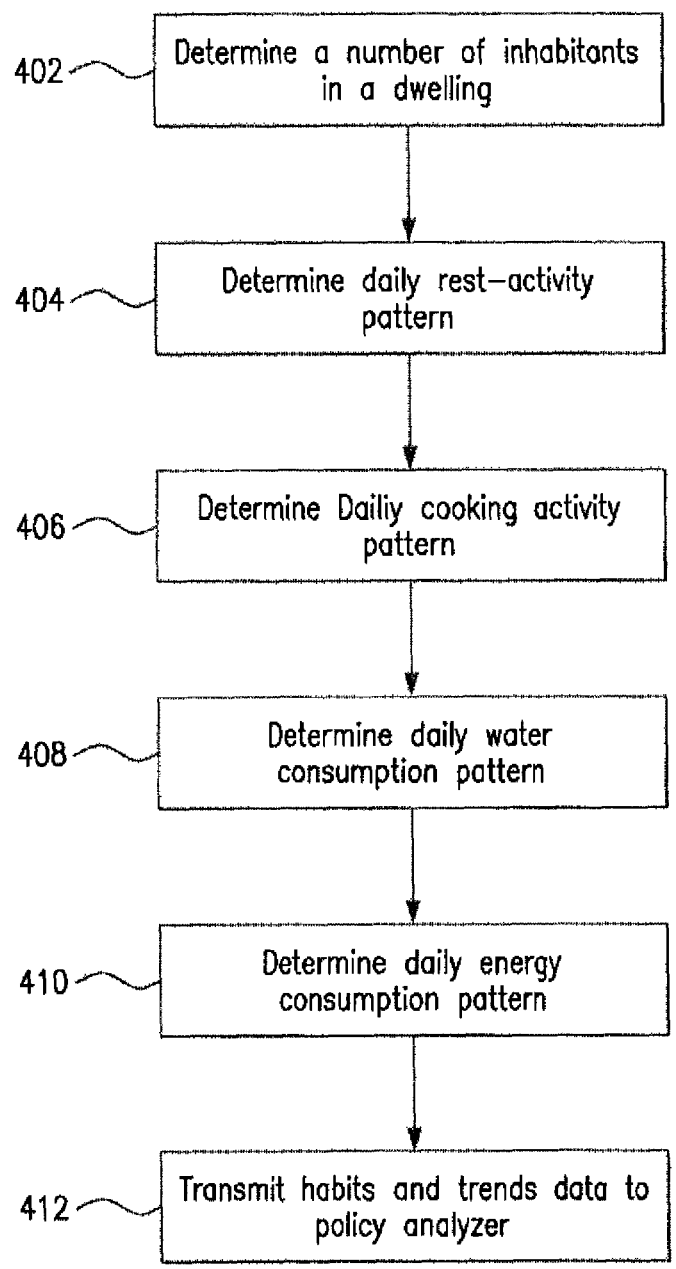
FIG. 4 is a system level diagram illustrating aggregation of data relating to a policyholder's insurance needs.

With reference now to FIG. 4, shown is insurance server 106 coupled to computing device 103 for receiving data from sensors 102 preferably relating to an insured property 300 in accordance with the above description. In addition to being coupled to computing device 103, insurance server 106 is also shown coupled to vehicle telematics device 402, external computing devices/servers 410 and a workplace device(s) 404. Network 100, and links 105 thereof (FIG. 1), preferably couple server 106 to each of the aforementioned components (e.g., computing device 103, workplace devices 404, telematics device 402 and external computing devices 410).

With respect to telematics device 402, it is preferably coupled to one or more user vehicles 408 for receiving telematics and related data/information from each coupled vehicle 408. The configuration, functionality and operability of telematics device 402 is described in commonly assigned U.S. Patent Application Ser. No. 61/881,335 which is incorporated by reference in its entirety herein. It is to be understood and appreciated, telematics device 402 provides user vehicle related information to be aggregated by insurance server 106 as discussed further below.

With regards to external computing devices 410, each is preferably associated with a service provider relating to a user's insured property, vehicle 408 and/or health condition. For instance, they may include (but are not limited to) emergency responders (e.g., police, fire, medical, alarm monitoring services, etc.), utility companies (e.g., power, cable (phone, internet, television, water), service providers (e.g., home appliance and automotive service providers), information/news providers (e.g., weather and traffic reports and other news items) and other like service/information/data providers.

In one aspect of the present invention, insurance server 106 may be coupled to one or more workplace devices 404 for evaluating policyholder's safety in the workplace. Safety in the workplace may include perils beyond driving, including (but not limited to) environmental conditions, physical stress and strain, and dangerous equipment. Sensors located in the policyholder's workplace may, for example, identify dangerous scenarios, including environmental conditions, worker behaviors, worker schedule, use or lack of use of proper safety equipment, and interactions with dangerous machines, substances or areas. Workplace devices may include (but not limited to) wearable devices 405 which may be worn by the policyholder, devices located on machinery 406, equipment 407, objects 409, and distributed around workplace environment. Workplace devices 404 are preferably configured to take a variety of measurements. For example, motion detectors worn by a policyholder may measure body motion as the policyholder moves around and carries out various tasks at work. Multiple motion sensors may be worn on different body parts to obtain detailed body movement information. Motion sensors may monitor speed, acceleration, position, rotation, and other characteristics of body and appendage motion. There are sensors available in the marketplace for determining the body posture of employees, particularly while lifting heavy objects. Chronic and acute back injuries are often the result of lifting objects using an improper lifting behavior, and can lead to high valued insurance claims. Pressure sensors embedded in the footwear of a policyholder or located on the floor of workplace also could provide information on the ergonomics, such as weight and weight distribution over different parts of policyholder's body. Workplace devices 404 may include many other types of sensors which may be used to gain information about the work habits of the policyholder.

Figure 5:
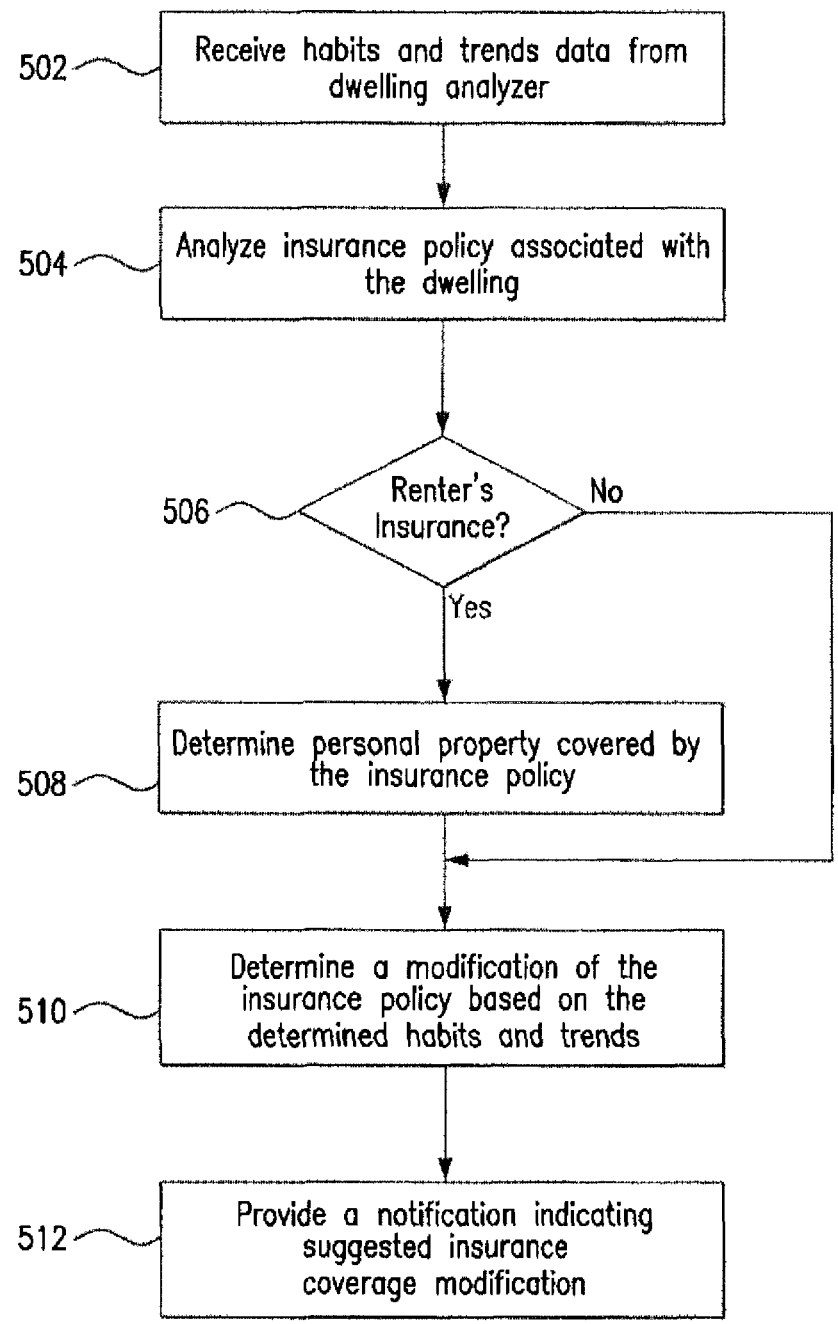
FIG. 5 is a floe diagram of operational steps of the data analyzer module of FIG. 3 in accordance with an illustrated embodiment.

FIG. 5 shows, in the form of a flow chart, exemplary operational steps of the data analyzer 306. Before turning to descriptions of FIG. 5, it is noted that the flow diagram shown therein is described, by way of example, with reference to components shown in FIGS. 1-4, although these operational steps may be carried out in any system and are not limited to the scenario shown in the aforementioned figures. Additionally, the flow diagram in FIG. 5 shows examples in which operational steps are carried out in a particular order, as indicated by the lines connecting the blocks, but the various steps shown in these diagrams can be performed in any order, or in any combination or subcombination.

With reference to FIG. 5, at 502, data analyzer 306 preferably collects data related to a policyholder's insured property 300 from sensors 102 placed at various locations in and around the insured property 300. In an embodiment of the present invention, this step may involve computing device 103 periodically contacting (via network 100), at prescribed time intervals, data analyzer component 304 running on server 106 to send accumulated data. In an alternative embodiment, contact between the computing device 103 and data analyzer 306 may be initiated when the data analyzer 306 contacts the computing device 103. Following the initial contact, data analyzer 306 may receive data from the computing device 103. It is to be understood data packets collected from sensors 102 can be aggregated in computing device 103 and sent as an aggregated packet to data analyzer 306 for subsequent analysis.

At 504, data analyzer 306 preferably collects telematics data from the telematics device(s) 402 (shown in FIG. 4) that are preferably coupled to one or more policyholder vehicles 408. As previously indicated, the telematics device 402 may be used to monitor a number of aspects of the use of the motor vehicles 408. For example, the telematics device 402 monitors the speed at which the vehicle is travelling. The telematics device 402 may also be able to send data related to braking habits of the policyholder (or another driver operating the vehicles 408) either using the GPS functionality or by using an accelerometer or having one or more sensors connected to a deceleration detection device, for example. The telematics device 402 may also be configured and operable to detect the distance travelled and if the vehicle was driven for a long time period without a break. In addition, the times of the day that the vehicle 408 is being driven can be captured as night time driving is statistically more dangerous than day time driving, especially weekend late night driving. According to an embodiment of the present invention, based on the data provided by telematics devices 402, the data analyzer 306 may be able to determine when the vehicle 408 turns without indicating, for example. In any event, the data from the telematics devices 402 may be transmitted to an insurance server 106 over a communication network 100.

At 506, data analyzer 306 preferably collects data related to a policyholder's health and wellness condition from, for example, aforementioned activity monitoring sensors 102 placed at various locations in and around the insured property 300. This data may include information related to policyholder's exercise, diet, habits, health history and conditions, as well as other wellness factors. The data analyzer 306 may use this data to calculate the policyholder's current wellness state, which can be used to classify a pool of policyholders according to degree of wellness. Furthermore, data analyzer 306 can use this classification level data to calculate impact on premiums based on wellness. As a result, policyholders who maintain a higher state of wellness relative to other same age and gender policyholders could receive lower premiums. Policyholders with a lower wellness status could be offered a reward (such as a reduced premium) or incentive for improving their state of wellness. According to embodiments of the present invention, data analyzer 306 may be configured and operable to process a large amount of health and wellness data received at 506.

At 508, data analyzer 306 preferably collects data from workplace devices 404 which may be used to gain information about the work habits of the policyholder. This data may include a variety of measurements described above. In an embodiment of the present invention, data analyzer 306 may utilize data gathered at 508, for example, to identify patterns and trends that could be used to reduce, through prevention, the occupational risks of injury and death associated with policyholder's workplace.

With continuing reference to the gathering of data in step 508, in an illustrated embodiment, an insurance company's Customer Relationship Management (CRM) tool/module may be operative to enable the insurance company to understand a policyholder better. For instance, the CRM tool is operative to determine the policyholder has a homeowners policy, a checking account, a life insurance policy and an investment device. Since this policyholder has multiple lines of business with the company, it is determined the loss performance may be lower than another policyholder with a homeowners policy only. Additionally, the CRM may be operative to determine the payment history for the policyholder. This information may be used to determine the policyholder's payment history as a data layer for making rating, acceptability, and/or coverage decisions.

With continuing reference to FIG. 5, data analyzer 306 preferably collects data related to a policyholder's surrounding risk characteristics. These risk characteristics can be data layers about the risks in the area where the insured lives. Examples of the risks that can be known about the insured or insured property are, but are not limited to, the hurricane risk, earthquake risk, flood risk, crime risk, wildfire risk, lightning risk, hail risk, and sinkhole risk. These risk factors can add to the information known about the insured and/or insured property and can be useful to the company for determining (and not to be understood to be limited to) pricing, acceptability, underwriting, and policy renewal.

Additionally, data analyzer 306 preferably collects data related to unstructured data. Unstructured data refers to information that either does not have a pre-defined data model or is not organized in a predefined manner. Unstructured data is typically text heavy, but may contain data like dates, numbers and facts. An example of the way an insurance company could collect unstructured data is from social media like Facebook and Twitter. For instance, a community in a high wildfire area organizes wildfire prevention and mitigation efforts through social media coordination efforts. The insurance company can monitor the social media sites and may know that this community is organizing and utilizing wildfire loss mitigation techniques. This data layer could be used along with the other information about the policyholder for decisions or offers relating to the insurance policy. Also, the insurance company may determine that this wildfire community is not giving out the latest wildfire science information to the community members. The insurance company could then provide the community with the latest in wildfire science mitigation techniques.

Various method steps have been shown at 502-508. It should be appreciated that in some embodiments one or more of the steps 502-508 may be combined into a single step. In some embodiments, one or more of the steps 502-508 may be changed in terms of order. In some embodiments, one or more steps may be omitted. In some embodiments, one or more additional steps may be included. Also, the above embodiments are not intended to be all inclusive. Moreover, data analyzer 306 may include a parser configured to parse, aggregate and classify the received data (at 502-508) based on, for example, type of sensor employed to collect a particular subset of the received data. Data analyzer 306 may create a data structure for each classification. Additionally, data analyzer 306 may store the captured informatics and telematics data in the data repository 310 (which is shown, in FIG. 3, as being part of, or used by, insurance server 106). The data repository 310 may comprise a database or any other suitable storage component. For example, the suitable storage component may comprise, or may otherwise make use of, magnetic or optical disks, volatile random-access memory, non-volatile random-access memory or any other type of storage device.

It should be appreciated that in some embodiments data analyzer 306 may be integrated with other sub-modules within the data analysis module 304, as well as other modules (not shown in FIG. 3), such as a user interface module, that may comprise or may otherwise make use of the insurance server 106. The analysis performed by data analyzer 306 may be used to make various types of decisions and/or enable the provision of certain products/services such as those that can be offered by an insurance carrier. In an embodiment of the present invention, at 510, data analyzer 306 may identify one or more insurance related decisions based on, for example, its interaction with the user interface module.

One type of decision that may be made is a claims decision. For example, if a claim is made under a homeowner's insurance policy associated with insured property 300, whether the claim is owed (or the amount to be paid) may depend on what caused the insured property 300 to be damaged or destroyed. Many homeowner's insurance policies insure against some perils, but not others (e.g., some policies cover fire but not earthquake). Another example is roof damage. If it was caused by wind or hail, many homeowner's policies will cover the damage. On the other hand, if the damage was caused by wear and tear or deterioration over time, the cost to repair or replace the roof would not be covered by the typical homeowner's policy. Thus, analysis of data associated with the insured property 300 received at 502 may be used to determine how the insured property 300 was damaged or destroyed, which may be relevant in determining whether a claim is covered or how much is owed.

Another type of decision that may be made based on, for example, telematics data received from telematics devices 402 (at 504) is an underwriting decision. For example, an insurance company may collect data about a vehicle and one or more drivers associated with the vehicle to determine whether to continue insuring that vehicle, or to set the premium for insuring the vehicle. In various embodiments, data analyzer 306 may update previously received or stored data to determine whether a risk (e.g., an underwriting risk) associated with providing an automobile insurance policy has changed. Based on the analysis of driver's use of the vehicle (including braking and accelerating among other examples) data analyzer 306 may recalculate a coverage amount or a premium of the insurance policy. Data analyzer 306 may amend the automobile insurance policy based on the telematics data analysis.

Another type of decision that may be made based on captured informatics sensor data is an alert decision. For example, if assessment of policyholder's health and wellness factors indicates a risk of some type of disease, which may be a concern for the policyholder's health, data analyzer 306 may issue an alert to the policyholder in order to encourage some kind of remedial action, such as seeing a doctor.

Still another type of decision may involve providing recommendations to make certain adjustments related to policyholder's work habits, for example. For instance, based upon certain analysis of policyholder's work habits, data analyzer 306 may identify a certain pattern that may increase occupational risk of injury. In response, data analyzer 306 may make recommendations with respect to, for instance, improper lifting behavior that may reduce the identified risks related to policyholder's work habits.

It should be appreciated that the specific decisions that are discussed above by no means constitute an exhaustive list. Any type of decision related to one or more insurance related products, such as health insurance products, property insurance products, vehicle insurance products, long term disability insurance products, and the like may be made by data analyzer 306.

According to an embodiment of the present invention, at 512, data analyzer 306 optionally selectively filters aggregated data based on the type of decisions need to be made. The main idea behind this aspect of the present invention is that data analyzer 306 may selectively filter out any non-relevant data before sending the data to the one or more predictive models described below, based on the context of the particular decision. In an embodiment of the present invention, data filtering feature may be implemented based on filtering rules predefined by the insurance company.

At 514, data analyzer 306 preferably utilizes one or more predictive models to rapidly make the one or more decisions identified at 510. Predictive modeling generally refers to techniques for extracting information from data to build a model that can predict an output from a given input. Predicting an output can include predicting policyholder's future behavior patterns and/or health-related risks, performing analysis to predict an occurrence of a certain peril, such as earthquake or hurricane, to name a few examples. Various types of predictive models can be used to analyze data and generate predictive outputs. Examples of predictive models include (but not limited to) Naive Bayes classifiers, linear and logistic regression techniques, support vector machines, neural networks, memory-based reasoning techniques, and the like. Typically, a predictive model is trained with training data that includes input data and output data that mirror the form of input data that will be entered into the predictive model and the desired predictive output, respectively. The amount of training data that may be required to train a predictive model can be large. It is noted that different types of predictive models may be used by data analyzer 306 depending on the type of decision and/or type of captured informatics sensor data. Additionally, a particular type of predictive model can be made to behave differently by data analyzer 306, for example, by adjusting the hyper-parameters or via feature induction or selection. In an embodiment of the present invention, one or more of the predictive models may be a predictive model markup language (PMML) model that defines the application of a model to selectively filtered-out data.

It should be appreciated that some comprehensive insurance related decisions may be made by aggregating results provided by the one or more predictive models. For instance, to recalculate a coverage amount or a premium of the life-insurance policy, data analyzer 306 may aggregate results provided by various models that predict risks associated with policyholder's health condition, workplace-related risks, insured property-related risks, CRM tool used by the insurance company, hurricane risk, earthquake risk, flood risk, crime risk, wildfire risk, lightning risk, hail risk, sinkhole risk, unstructured data available, and the like.

At 516, data analyzer 306 preferably provides results to users via, for example, the aforementioned user interface module. Alternatively, data analyzer 306 may store the generated results in the data repository 310.

Advantageously, data analyzer 306 provides a powerful insurance related decision making engine that is contingent upon dynamically captured informatics sensor data. In another aspect, data analyzer 306 may also provide for "one click" process to facilitate a rapid insurance-related action. This "one click" process can quickly provide the insured a quote on, for example and not limited to, a homeowner or auto insurance policy. An embodiment of this idea would be the insurance company collects the information about the insured using the ways illustrated above, and the insured either only has to provide very little or no additional information about their home or car. This can quicken the quote process. For example, the insurance company can solicit a homeowners policy to the insured, the insured can see a picture of their home on a mobile phone with all the home characteristics already provided. The insured would only need to select "buy" and they have purchased their home insurance.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for rendering a decision regarding an insurance policy, the method comprising:
   receiving, by one or more processors, property attributes identifying a condition of a property associated with a user from an electronic sensor device;
   receiving, by the one or more processors, vehicle attributes regarding an operation of a vehicle associated with the user from a telematics sensor device;
   receiving, by the one or more processor, fitness attributes identifying a physical aspect of the user from a fitness sensor device;
   traversing, by the one or more processors, a social media website;
   identifying, by the one or more processors, data indicative of prevention and mitigation efforts displayed on the social media website, wherein the data indicative of prevention and mitigation efforts is for one or more environmental perils, associated with the property, and related to a type of the decision to be made;
   providing, by the one or more processors, the property attributes, the vehicle attributes, the fitness attributes and the data indicative of the prevention and mitigation efforts from the social media website to a predictive model, wherein the predictive model is configured to selectively filter a relevant subset of the property attributes, the vehicle attributes, and the fitness attributes based on a type of the decision regarding the insurance policy;
   identifying, by the one or more processors, possible future behavior patterns, health-related risks, or an occurrence of a certain peril, or any combination thereof, as a first output from the predictive model;
   receiving, by the one or more processors, a risk value indicative of a risk associated with the user based on the possible future behavior patterns, the health-related risks, or the occurrence of a certain peril, or any combination thereof, and the data indicative of the prevention and mitigation efforts from the social media website as a second output from the predictive model;
   transmitting, by the one or more processors, updated prevention and mitigation techniques to be displayed on the social media website; and
   rendering, by the one or more processors, the decision regarding the insurance policy based at least in part upon the first output and the second output.

2. The method of claim 1, wherein the condition of the property relates to a utility systems associated with the property, a structural condition of the property, or an environmental condition detected in a vicinity of the property based on sensors not associated with the property, or any combination thereof.

3. The method of claim 1, wherein the vehicle attribute measures speed, acceleration, and deceleration of the vehicle during a time interval.

4. The method of claim 1, wherein the physical aspect of the user relates to movement or posture, or both.

5. The method of claim 1, wherein the predictive model is further built based on an environmental risk associated with a geographic region that includes the property.

6. The method of claim 5, where the environmental risk is one of a hurricane risk, an earthquake risk, a flood risk, a crime risk, a wildfire risk, a lightning risk, a hail risk, or a sinkhole risk, or any combination thereof.

7. The method of claim 1, wherein the risk value is determined at a time interval.

8. The method of claim 1, wherein the risk associated with the user is indicative of a likelihood of the user developing a health condition and the decision is to alert the user about the risk.

9. The method of claim 1, wherein the decision relates to at least one of a health insurance product, a property insurance product, a life insurance product, a vehicle insurance product, or a long term disability insurance product, or any combination thereof.

10. A non-transient computer readable storage medium storing instructions that, when executed by one or more processors, cause the one or more processors to perform operations comprising:

receiving, by one or more processors, property attributes identifying a condition of a property associated with a user from an electronic sensor device;

receiving, by the one or more processors, vehicle attributes regarding an operation of a vehicle associated with the user from a telematics sensor device;

receiving, by the one or more processors, fitness attributes identifying a physical aspect of the user from a fitness sensor device;

traversing, by the one or more processors, a social media website;

identifying, by the one or more processors, data indicative of prevention and mitigation efforts displayed on the social media website, wherein the data indicative of prevention and mitigation efforts is for one or more environmental perils, associated with the property, and related to the type of decision to be made;

providing, by the one or more processors, the property attributes, the vehicle attributes, the fitness attributes, and the data indicative of prevention and mitigation efforts from the social media website to a predictive model, wherein the predictive model is configured to selectively filter a relevant subset of the property attributes, the vehicle attributes, and the fitness attributes based on a type of the decision regarding an insurance policy;

identifying, by the one or more processors, possible future behavior patterns, health-related risks, or an occurrence of a certain peril, or any combination thereof, as a first output from the predictive model;

receiving, by the one or more processors, a risk value indicative of a risk associated with the user based on the possible future behavior patterns, the health-related risks, or the occurrence of a certain peril, or any combination thereof, and the data indicative of prevention and mitigation efforts from the social media website as a second output from the predictive model;

transmitting, by the one or more processors, updated prevention and mitigation techniques to be displayed on the social media website; and rendering, by the one or more processors, a decision regarding the insurance policy based at least in part upon the first output and the second output.

11. The medium of claim 10, wherein the condition of the property relates to a utility systems associated with the property, a structural condition of the property, or an environmental condition detected in a vicinity of the property based on sensors not associated with the property, or any combination thereof.

12. The medium of claim 10, wherein the vehicle attribute measures speed, acceleration, and deceleration of the vehicle during a time interval.

13. The medium of claim 10, wherein the physical aspect of the user relates to movement or posture, or both.

14. The medium of claim 10, wherein the predictive model is further built based on an environmental risk associated with a geographic region that includes the property.

15. The medium of claim 10, wherein the decision is regarding whether to continue to provide coverage to the user or an insurance claim made by the user.

16. A computer-implemented method for rendering a decision regarding an insurance policy, the method comprising:

receiving, by the one or more processors, from electronic sensor devices, attributes that identify a condition of a property associated with a user, regard an operation of a vehicle associated with the user, and identify a physical aspect of the user;

traversing, by the one or more processors, a social media website;

identifying, by the one or more processors, data indicative of prevention and mitigation efforts displayed on the social media website, wherein the data indicative of prevention and mitigation efforts is for one or more environmental perils, associated with the property, and related to the type of decision to be made;

receiving, by the one or more processors, the data indicative of prevention and mitigation efforts from the social media website;

providing, by the one or more processors, the attributes and the data indicative of prevention and mitigation efforts from the social media website to a predictive model, wherein the predictive model is configured to selectively filter a relevant subset of the attributes based on a type of the decision regarding an insurance policy;

identifying, by one or more processors, possible future behavior patterns, health-related risks, or an occurrence of a certain peril, or any combination thereof, as a first output from the predictive model;

receiving, by the one or more processors, a risk value indicative of a risk associated with the user based on the possible future behavior patterns, the health-related risks, or the occurrence of a certain peril, or any combination thereof, and the data indicative of prevention and mitigation efforts from the social media website as a second output from the predictive model;

transmitting, by the one or more processors, updated prevention and mitigation techniques to be displayed on the social media website; and rendering, by the one or more processors, the decision regarding the insurance policy based at least in part upon the first output and the second output.

* * * * *